United States Patent Office 3,558,647
Patented Jan. 26, 1971

3,558,647
2-(2-AMINOPHENYL)-PHTHALIMIDINES
Theodore S. Sulkowski, Narberth, and Albert A. Mascitti, Norristown, Pa., assignors to American Home Products Corporation, New York, N.Y., a corporation of Delaware
No Drawing. Original application Mar. 14, 1967, Ser. No. 622,920, now Patent No. 3,466,297, dated Sept. 9, 1969. Divided and this application Mar. 3, 1969, Ser. No. 825,472
Int. Cl. C07d 27/50
U.S. Cl. 260—325                              8 Claims

ABSTRACT OF THE DISCLOSURE

The present invention is concerned with 2-(2-aminophenyl)phthalimidines and 2 - (2 - aminophenyl)isoindolines. These 2-(2-aminophenyl)phthalimidines are useful intermediates in the preparation of their corresponding 2-(2-aminophenyl)isoindolines which are pharmacologically efficacious as anti-convulsants.

This application is a division of our prior, copending application, Ser. No. 622,920, filed Mar. 14, 1967, now U.S. Pat. No. 3,466,297.

This invention relates to new and novel phthalimidines and isoindolines. In particular, the present invention is concerned with 2-(2-aminophenyl)phthalimidines which are useful intermediates in the production of 2-(2-aminophenyl)isoindolines which have demonstrated pharmacological activity and are useful as anti-convulsants.

The novel compounds which are included within the scope of this invention are represented by the following formula:

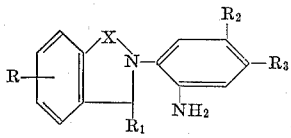

wherein R is selected from the group consisting of amino, halogen, halo(lower)alkyl, lower alkoxy and lower alkyl; $R_1$ is selected from the group consisting of lower alkyl, phen(lower)alkyl, phenyl, aminophenyl, halophenyl, halo(lower) alkylphenyl, lower alkoxyphenyl, lower alkylphenyl, thienyl, pyridyl, and furyl; $R_2$ and $R_3$ are selected from the group consisting of hydrogen and halogen; X is selected from the group consisting of methylene and carbonyl; and the acid addition salts thereof.

The new compounds of the aforesaid formula where X is carbonyl are called "2-(2-aminophenyl)phthalimidines." Typical examples thereof are: 2-(2-aminophenyl)-3-phenylphthalimidine; 2-(2-amino-4,5-dichlorophenyl)-3-phenylphthalimidine; and 2-(2-amino-4,5-dibromophenyl)-3-phenylphthalimidine. Alternatively when X is methylene, the compounds are called "2-(2-aminophenyl)isoindolines," such as, 2-(2-aminophenyl)-1-phenylisoindoline; 2-(2-amino-4,5-dichlorophenyl)-1-phenylisoindoline and 2-(2-amino-4,5-dibromophenyl)-1-phenylisoindoline.

The new and novel 2-(2-aminophenyl)phthalimidines and 2-(2-aminophenyl)isoindolines of the present invention are prepared by the process which is illustrated by the following reaction scheme:

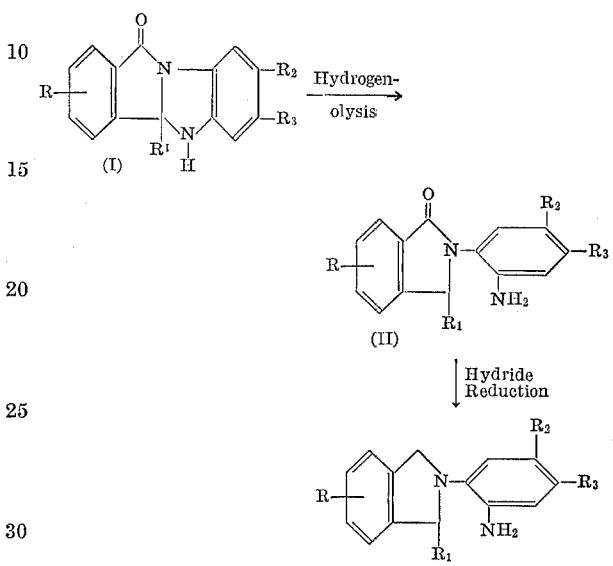

wherein R, $R_1$, $R_2$ and $R_3$ are defined as above.

The hydrogenolysis reaction is effected by contacting an isoindolobenzimidazolone (I) with a palladium charcoal catalyst, in an appropriate solvent, e.g. an alkanol or acetic acid, under a positive hydrogen atmosphere with stirring until the hydrogen uptake ceases. Preferably this reaction is conducted with a 10% palladium on charcoal catalyst in acetic acid under about 45 p.s.i. of hydrogen pressure.

When the hydrogenolysis reaction is complete, the intermediate (II) is separated by procedures well known in the art, for example, the catalyst is removed by filtration or decantation; the filtrate evaporated to dryness; the residue dissolved in water, basified with a base, e.g. sodium hydroxide, potassium hydroxide, sodium bicarbonate and potassium bicarbonate; extracted with a water-immiscible solvent, for example, ethyl acetate, ether, chloroform, carbon tetrachloride and benzene; and the extract evaporated to dryness to afford a 2-(2-aminophenyl)phthalimidine (II). It should be noted that this hydrogenolysis reaction will also convert any nitro substituent present on the isoindolobenzimidazolone (II) to the corresponding amino substituent on the resulting 2-(2-aminophenyl)isoindoline (II).

Hydride reduction of the above prepared 2-(2-aminophenyl)phthalimidine (II) is accomplished by contact with lithium aluminum hydride, in an anhydrous, reaction-inert organic solvent, at a temperature range of about 35° C. to about 110° C. for a period of about three to about fifteen hours. Preferably this reaction is conducted in ether at about the reflux temperature of the reaction mixture for a period of about five hours.

When the hydride reduction is completed, the resulting 2-(2-aminophenyl)isoindoline (III) is recovered by conventional means, such as, concentration and recrystallization from a suitable solvent, such as an aqueous alkanol, chloroform-hexane, benzene-hexane and toluene-hexane.

Since many of the compounds prepared by the present invention are basic, advantage may be taken of the water solubility of salts of these compounds formed with acids in the isolation and/or purification of the above compounds and in the preparation of aqueous solutions of these new compounds for oral or parenteral administration. Of course, only salts formed with pharmaceutically acceptable acids should be employed in therapeutic applications. Particularly effective salts are those formed with pharmaceutically acceptable acids having a pK value of 3 or lower. Such acids are well known in the art, for example, hydrochloric, hydrobromic, sulfuric, nitric, phosphoric, benzenesulfonic, toluenesulfonic, methanesulfonic, ethanesulfonic acids and the like. These salts may be prepared by procedures commonly employed in the art, for example, reacting the compounds with an equivalent of the selected acid in aqueous solution and concentration of the solution. Other known procedures may also be employed.

The time and temperature ranges employed in the aforesaid hydride reduction reaction is not critical but simply represents the most convenient range consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time. By "palladium charcoal catalyst" as employed herein is meant a catalyst consisting of about two percent to about ten percent palladium on charcoal. The term "positive hydrogen atmosphere" is defined to mean a hydrogen atmosphere under a positive pressure of about 15 p.s.i. to about 75 p.s.i. and the term "anhydrous, reaction-inert organic solvent" includes any water-free organic solvent which will dissolve the 2-(2-aminophenyl)phthalimidine (II) but will not interfere with the hydride reduction thereof. Many such solvents are well known to those skilled in the art of organic chemistry, examples are: ether, tetrahydrofuran, dioxan and diethylene glycol dimethyl ether.

The isoindolobenzimidazolone reactants (I) employed in the preparation of the compounds of the present invention are known compounds which are described and claimed in copending U.S. patent application, Ser. No. 523,930, filed on Feb. 1, 1966, entitled "Substituted Dihydro 11H-Isoindolo [2,1 - a]Benzimidazol-11-Ones and Related Compounds," now U.S. Pat. No. 3,423,421.

In accord with the present invention the novel 2-(2-aminophenyl)phthalimidines (II) herein described are utilized as intermediates in the preparation of the 2-(2-aminophenyl)isoindolines of the present invention.

In further accord with the present invention, the novel 2-(2-aminophenyl)isoindolines (II) herein described have been found to possess interesting pharmacological properties in mice. In standard pharmacological tests, e.g. electrical shock, using mice as the experimental animal, these compounds have exhibited anti-convulsant activity at a dosage level of 125 mg./kg.

When the compounds of this invention are employed for the aforesaid purposes, they may be administered alone or in combination with acceptable carriers, the proportion of which is determined by the solubility and chemical nature of the compound, chosen route of administration and standard testing practice. They may be administered orally or injected parenterally, that is intramuscularly, intravenously or subcutaneously. For parenteral administration they may be used in the form of a sterile solution containing other solutes, for example, enough saline or glucose to make the solution isotonic.

The following examples are given by way of illustration and are not to be construed as limitations of this invention, many variations of which are possible without departing from the scope and spirit thereof.

EXAMPLE I

A mixture of 25 g. of 4b-phenyl-4b,5-dihydro-11H-isoindolo[2,1-a]benzimidazol-11-one, 5 g. of 10% palladium on charcoal and 200 ml. of acetic acid is shaken with hydrogen at an initial pressure of 43 p.s.i. After the hydrogen uptake ceases (within one hour), the catalyst is separated by filtration and the filtrate evaporated to dryness. The solid residue is dissolved in water and made basic with sodium hydroxide solution. The mixture is extracted with ethyl acetate. After drying over magnesium sulfate, the extract is evaporated in vacuo to afford 2-(2-aminophenyl)-3-phenylphthalimidine, M.P. 190–192° C.

Twelve grams of 2-(2-aminophenyl)-3-phthalimidine are added to a stirred suspension of 6 g. of lithium aluminum hydride in 400 ml. of anhydrous ether and heated to reflux for five hours. After the mixture is decomposed by careful addition of water, the ether layer is separated, dried over magnesium sulfate, and evaporated to dryness. On recrystallization of the residue from ethyl acetate-hexane, there is obtained 2-(2-aminophenyl)-1-phenylisoindoline, M.P. 128–130° C.

*Analysis.*—Calc'd for $C_{20}H_{18}N_2$ (percent): C, 83.88; H, 6.33; N, 9.79. Found (percent): C, 83.80; H, 6.61; N, 10.07.

In the same manner, 8 - iodo - 4b-(4-trifluoromethylphenyl) - 4b,5 - dihydro - 11H - isoindolo[2,1-a]benzimidazol-11-one is converted to 2-(2-amino-5-iodophenyl)-3-(4-trifluoromethylphenyl)phthalimidine which is then subjected to hydride reduction to yield 2(2-amino-5-iodophenyl)-1-(4-trifluoromethylphenyl)isoindoline.

EXAMPLE II

A mixture of 12.5 g. of 7,8-dichloro-4b-phenyl-4b,5-dihydro-1H-isoindolo[2,1-a]benzimidazol-11-one, 5 g. of 5% palladium on charcoal and 100 ml. of acetic acid is shaken with hydrogen at an initial pressure of 75 p.s.i. After the hydrogen uptake ceases, the catalyst is separated by filtration and the filtrate evaporated to dryness. The solid residue is dissolved in water, made basic with potassium hydroxide solution and extracted with chloroform. After drying over magnesium sulfate, the extract is evaporated to afford 2-(2-amino-4,5-dichlorophenyl)phenylphthalimidine.

Six grams of the above prepared 2-(2-amino-4,5-dichlorophenyl)-3-phenylphthalimidine are added to a stirred suspension of 3 g. of lithium aluminum hydride in 200 ml. of anhydrous dioxan and heated to 100° C. for three hours. After the mixture is decomposed by careful addition of water, the dioxan layer is separated, dried over magnesium sulfate, and evaporated to dryness. On recrystallization of the residue from aqueous ethanol, there is obtained 2 - (2-amino-4,5-dichlorophenyl)-1-phenylisoindoline.

Similarly, 7,8-dibromo-4b-phenethyl-4b,5-dihydro-11H-isoindolo[2,1-a]benzimidazol-11-one is converted to 2-(2-amino - 4,5 - dibromophenyl) - 3 - phenethylphthalimidine which is then subjected to hydride reduction to afford 2-(2-amino-4,5-dibromophenyl)-1-phenylisoindoline.

EXAMPLE III

The procedure of Examples I and II is repeated on the hereinafter listed isoindolobenzimidazolones to produce the following 2-(2-aminophenyl)phthalimidines which are then converted to the corresponding 2-(2-aminophenyl)isoindolines:

| Starting material | Intermediate | Product |
|---|---|---|
| 4b-(4-chlorophenyl)-4b,5-dihydro-11H-isoindolo[2,1-a]benzimidazol-11-one. | 2-(2-aminophenyl)-3-(4-chlorophenyl)phthalimidine. | 2-(2-aminophenyl)-1-(4-chlorophenyl)isoindoline. |
| 7-bromo-4b-(4-bromophenyl)-4b,5-dihydro-11H-isoindolo[2,1-a]benzimidazol-11-one. | 2-(2-amino-4-bromophenyl)-3-(4-bromophenyl)phthalimidine. | 2-(2-amino-4-bromophenyl)-1-(4-bromophenyl)isoindoline. |
| 4b-(α-thienyl)-4b,5-dihydro-11Hi-soindolo[2,1-a]benzimidazol-11-one. | 2-(2-aminophenyl)-3-(α-thienyl)phthalimidine. | 2-(2-aminophenyl)-1-(α-thienyl)-isoindoline. |
| 4b-furyl-2-nitro-4b,5-dihydro-11Hi-soindolo[2,1-a]benzimidazol-11-one. | 2-(2-aminophenyl)-6-amino-3-furylphthalimidine. | 2-(2-aminophenyl)-5-amino-1-furyl-isoindoline. |
| 3-chloro-4b-pyridyl-4b,5-dihydro-11H-isoindolo[2,1-a]benzimidazol-11-one. | 2-(2-aminophenyl)-6-chloro-3-pyridylphthalimidine. | 2-(2-aminophenyl)-6-chloro-1-pyridylisoindoline. |
| 2-dichloromethyl-4b-phenyl-4b,5-dihydro-11H-isoindolo[2,1-a]benzimidazol-11-one. | 2-(2-aminophenyl)-6-dichloromethyl-3-phenylphthalimidine. | 2-(2-aminophenyl)-5-dichloromethyl-1-phenylisoindoline. |
| 4b-methyl-4b,5-dihydro-11H-isoindolo[2,1-a]benzimidazol-11-one. | 2-(2-aminophenyl)-3-methylphthalimidine. | 2-(2-aminophenyl)-1-methylisoindoline. |
| 2-bromo-4b-ethyl-4b,5-dihydro-11H-isoindolo[2,1-a]benzimidazol-11-one. | 2-(2-aminophenyl)-6-bromo-3-ethylphthalimidine. | 2-(2-aminophenyl)-5-bromo-1-ethylisoindoline. |
| 3-trifluoromethyl-4b-propyl-4b,5-dihydro-11H-isoindolo[2,1-a]benzimidazol-11-one. | 2-(2-aminophenyl)-5-trifluoromethyl-3-propylphthalimidine. | 2-(2-aminophenyl)-6-trifluoromethyl-1-propylisoindoline. |

EXAMPLE IV

A mixture of 25 g. of 4b-benzyl-4b,5-dihydro-11H-isoindolo[2,1-a]benzimidazol-11-one, 25 g. of 2% palladium on charcoal and 200 ml. of acetic acid is shaken with hydrogen at an initial pressure of 15 p.s.i. After the hydrogen uptake is complete, the catalyst is separated by filtration and the filtrate evaporated to dryness. The solid residue is dissolved in water, made basic with sodium bicarbonate solution and the mixture is extracted with benzene. After drying over magnesium sulfate, the extract is evaporated in vacuo to afford 2-(2-aminophenyl)-3-benzylphthalimidine.

Three grams of 2-(2-aminophenyl)-3-benzylphthalimidine are added to a stirred suspension of 1.5 g. of lithium aluminum hydride in 100 ml. of anhydrous tetrahydrofuran and heated to reflux for seven hours. After the mixture is decomposed by careful addition of water, the tetrahydrofuran layer is separated, dried over magnesium sulfate, and evaporated to dryness. On recrystallization of the residue from chloroform-hexane, there is obtained 2-(2-aminophenyl)-1-benzylisoindoline.

Similarly, 2-(2-aminophenyl) - 6 - methoxy-3-(4-aminophenyl)phthalimidine and 2-(2-amino-5-iodophenyl)-3-phenylphthalimidine are produced and then respectively converted to 2-(2-aminophenyl)-5-methoxy-1-(4-aminophenyl)isoindoline and 2-(2-amino - 5 - iodophenyl)-1-phenylisoindoline.

EXAMPLE V

A mixture of 50 g. of 4b-(4-chlorophenyl)-3-propoxy-4b,5-dihydro - 11H - isoindolo[2,1-a]benzimidazol-11-one, 10 g. of 10% palladium on charcoal and 400 ml. of acetic acid is shaken with hydrogen at an initial pressure of 50 p.s.i. After the hydrogen uptake ceases, the catalyst is separated by filtration and the filtrate evaporated to dryness. The solid residue is dissolved in water and made basic with potassium bicarbonate solution. The mixture is extracted with ethyl acetate. After drying over magnesium sulfate, the extract is evaporated in vacuo to afford 2 - (2 - aminophenyl)-3-(4-chlorophenyl) - 5 - propoxyphthalimidine.

Twelve grams of the above prepared 2-(2-aminophenyl) - 3 - (4 - chlorophenyl)phthalimidine are added to a stirred suspension of 6 g. of lithium aluminum hydride in 400 ml. of anhydrous diethylene glycol dimethyl ether and heated to reflux for five hours. After the mixture is decomposed by careful addition of water, the diethylene glycol dimethyl ether layer is separated, dried over magnesium sulfate, and evaporated to dryness. On recrystallization of the residue from benzene-hexane, there is obtained 2-(2-aminophenyl)-1-(4-chlorophenyl)isoindoline.

In the same manner, 4b-(4-dichloromethylphenyl)-4b,5-dihydro - 11H - isoindolo[2,1-a]benzimidazol-11-one is converted to 2 - (2 - aminophenyl)-3-(4-dichloromethylphenyl)phthalimidine which is then contacted with lithium aluminum hydride to afford 2-(2-aminophenyl)-1-(4-dichloromethylphenyl)isoindoline.

EXAMPLE VI

A mixture of 25 g. of 3-methyl-4b-(4-tolyl)-4b,5-dihydro-11H-isoindolo[2,1-a]benzimidazol-11-one, 5 g. of 10% palladium on charcoal and 200 ml. of acetic acid is shaken with hydrogen at an initial pressure of 50 p.s.i. After the hydrogen uptake ceases (within one hour), the catalyst is separated by filtration and the filtrate evaporated to dryness. The solid residue is dissolved in water and made basic with sodium hydroxide solution. The mixture is extracted with chloroform. After drying over magnesium sulfate, the extract is evaporated in vacuo to afford 2-(2-aminophenyl) - 5 - methyl-3-(4-tolyl)phthalimidine.

Six grams of 2-(2-aminophenyl)-5-methyl-3-(4-tolyl)phthalimidine are added to a stirred suspension of 3 g. of lithium aluminum hydride in 200 ml. of anhydrous ether and heated to 35° C. for fifteen hours. After the mixture is decomposed by careful addition of water, the ether layer is separated, dried over magnesium sulfate, and evaporated to dryness. On recrystallization of the residue from toluene-hexane, there is obtained 2-(2-aminophenyl)-6-methyl-1-(4-tolyl)-isoindoline.

Similarly, 2-ethyl - 4b - phenyl-4b,5-dihydro-11H-isoindolo[2,1-a]benzimidazol-11-one is converted to 2-(2-aminophenyl)-6-ethyl-3-phenylphthalimidine which is then contacted with lithuim aluminum hydride to produce 2-(2-aminophenyl)-5-ethyl-1-phenylisoindoline.

EXAMPLE VII

A mixture of 75 g. of 4b-benzyl-3-propyl-4b,5-dihydro-11H-isoindolo[2,1-a]benzimidazol-11-one, 15 g. of 10% palladium on charcoal and 600 ml. of acetic acid is shaken with hydrogen at an initial pressure of 45 p.s.i. After the hydrogen uptake ceases, the catalyst is separated by filtration and the filtrate evaporated to dryness. The solid residue is dissolved in water and made basic with sodium hydroxide solution. The mixture is extracted with ethyl acetate. After drying over magnesium sulfate, the extract is evaporated in vacuo to afford 2-(1-aminophenyl)-3-benzyl-5-propylphthalimidine.

Twenty-four grams of the above prepared 2-(2-aminophenyl)-3-benzyl-5-propylphthalimidine are added to a stirred suspension of 12 g. of lithium aluminum hydride in 800 ml. of anhydrous ether and heated to reflux for five hours. After the mixture is decomposed by careful addition of water, the ether layer is separated, dried over magnesium sulfate, and evaporated to dryness. On recrystallization of the residue from ethyl acetate-hexane, there is obtained 2-(2-aminophenyl)-1-benzyl-6-propylisoindoline.

Similarly, 4b-(4-ethoxyphenyl) - 4b,5 - dihydro-11H-isoindolo[2,1-a]benzimidazol-11-one is converted to 2-(2-aminophenyl)-3-(4-ethoxyphenyl)phthalimidine which is then subjected to hydride reduction to afford 2-(2-aminophenyl)-1-(4-ethoxyphenyl)isoindoline.

What is claimed is:
1. A compound selected from the group consisting of those having the formula:

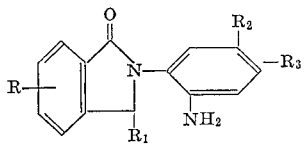

wherein R is selected from the group consisting of amino, halogen, halo(lower)alkyl, lower alkoxy and lower alkyl; $R_1$ is selected from the group consisting of lower alkyl, phen(lower)alkyl, phenyl, aminophenyl, halophenyl, halo(lower)alkylphenyl, lower alkoxyphenyl, lower alkylphenyl, thienyl, pyridyl, and furyl; $R_2$ and $R_3$ are selected from the group consisting of hydrogen and halogen and the acid addition salts thereof.

2. A compound as described in claim 1 which is: 2-(2-aminophenyl)-3-phenylphthalimidine.

3. A compound as described in claim 1 which is: 2-(2-amino-4,5-dichlorophenyl)-3-phenylphthalimidine.

4. A compound as described in claim 1 which is: 2-(2-amino-4,5-dibromophenyl)-3-phenylphthalimidine.

5. A compound as claimed in claim 1 which is 2-(2-aminophenyl)-3-benzylphthalimidine.

6. A compound as claimed in claim 1 which is: 2-(2-aminophenyl)-3-(4-chlorophenyl) - 5 - propoxyphthalimidine.

7. A compound as claimed in claim 1 which is: 2-(2-aminophenyl)-5-methyl-3-(4-tolyl)phthalimidine.

8. A compound as claimed in claim 1 which is: 2-(2-aminophenyl)-3-benzyl-5-propylphthalimidine.

References Cited
UNITED STATES PATENTS
3,379,733    4/1968    Houlihan.

ALEX MAZEL, Primary Examiner

J. A. NARCAVAGE, Assistant Examiner